(12) United States Patent
Matsuba

(10) Patent No.: US 6,175,935 B1
(45) Date of Patent: Jan. 16, 2001

(54) SOFTWARE DEBUGGING METHOD AND RECORDING MEDIUM TO WHICH DEBUGGING PROGRAM HAS BEEN RECORDED

(75) Inventor: Harumi Matsuba, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/095,567

(22) Filed: Jun. 11, 1998

(30) Foreign Application Priority Data

Jun. 19, 1997 (JP) .................................................. 9-162428

(51) Int. Cl.$^7$ .............................. G06F 9/45; G06F 11/36
(52) U.S. Cl. ..................................................... 714/38; 717/4
(58) Field of Search .................................. 714/38, 35, 25, 714/47, 48, 49; 703/22, 23, 26; 717/4, 5, 11; 707/203

(56) References Cited

U.S. PATENT DOCUMENTS

| | | | |
|---|---|---|---|
| 5,182,807 | * 1/1993 | Mizuse et al. | 717/3 |
| 5,675,803 | * 10/1997 | Priesler et al. | 717/4 |
| 5,832,273 | * 11/1998 | Mizuse | 717/9 |

FOREIGN PATENT DOCUMENTS

| | | |
|---|---|---|
| 0 092 646 | 2/1983 | (EP) . |
| 0140752 | 9/1984 | (EP) . |
| 0 321 000 | * 12/1988 | (EP) .................................. G06F/9/44 |
| 0 514 806 | * 5/1992 | (EP) .................................. G06F/11/00 |
| 63-301339 | 12/1988 | (JP) . |
| 6-79290 | 10/1994 | (JP) . |
| 7-44370 | 2/1995 | (JP) . |
| WO 92/08231 | 5/1992 | (WO) . |
| WO 96/38790 | 12/1996 | (WO) . |

* cited by examiner

Primary Examiner—Robert W. Beausoliel, Jr.
Assistant Examiner—Christopher Revak
(74) Attorney, Agent, or Firm—McGinn & Gibb, PLLC

(57) ABSTRACT

A software debugging method and a recording medium to which a debugging program has been recorded permit a shorter total time required for converting a source program to an object program and the time required for loading an object program into a debugging device. When it has been determined that a stored information file (108) exists, a linker (104) receives the stored information to compare a module size "m" before correction with a module size "n" after correction. If the module size "m" before correction is smaller than the module size "n" after correction, then those of up to the m-th module among the corrected modules are allocated to an actual memory area of a memory (107) where the modules before correction have been stored, and continuous addresses in an extended memory area (202) of the memory (107) are allocated to the programs from an address of (m+1) and after. Further, an object program (105) which has address space information is output and loaded into a debugging device (106). This permits a shortened processing time which includes the loading time.

6 Claims, 5 Drawing Sheets

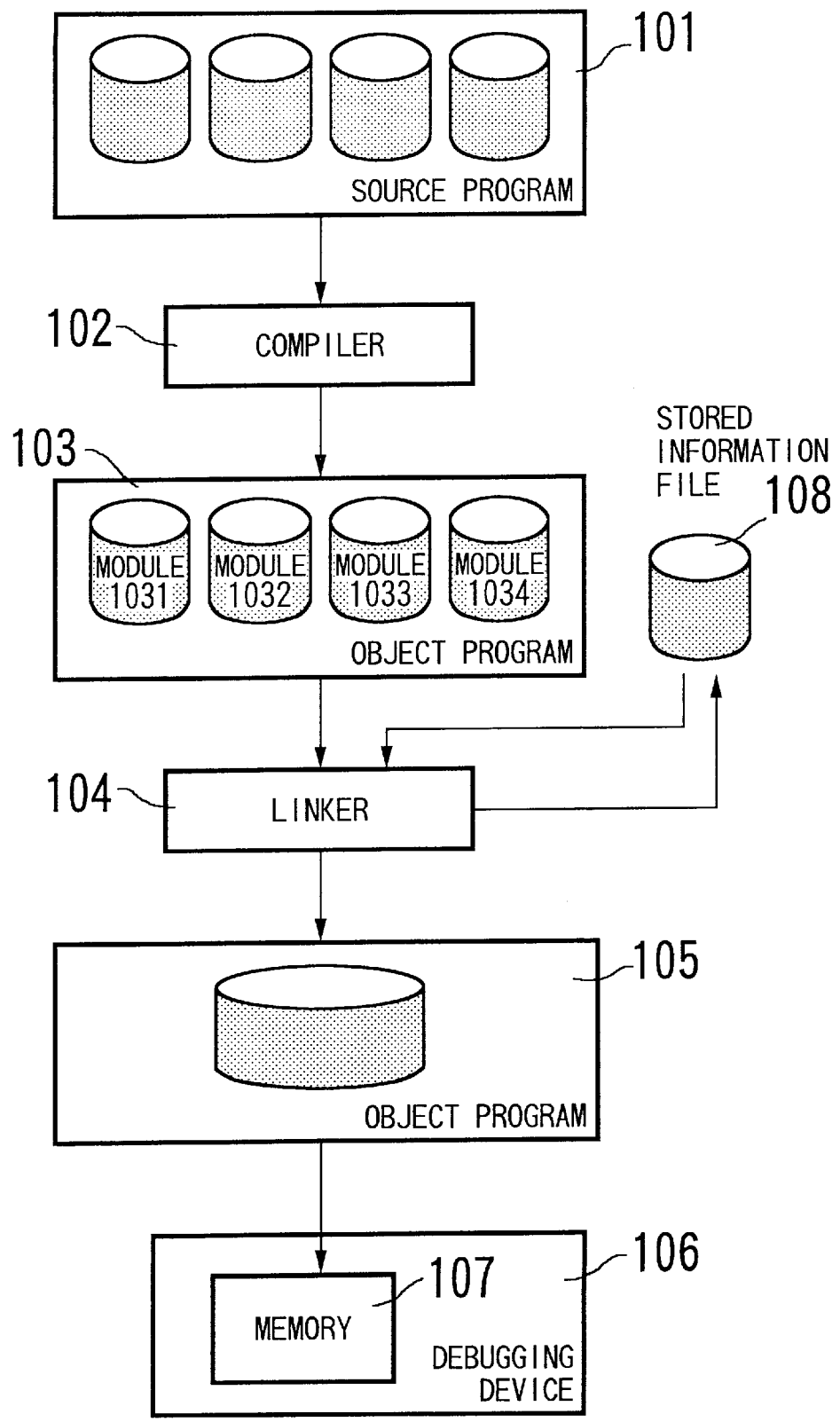

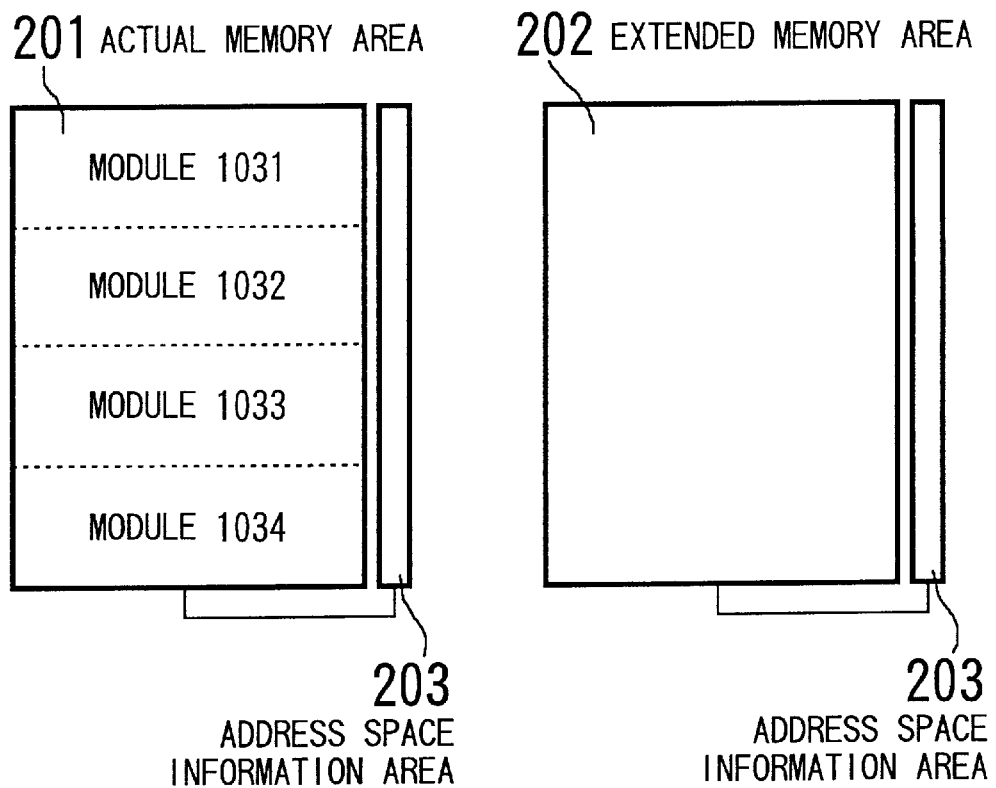

SOFTWARE DEBUGGING METHOD AND RECORDING MEDIUM TO WHICH DEBUGGING PROGRAM HAS BEEN RECORDED

BACKGROUND OF THE INVENTION

1. Field of the Invention

The present invention relates to a software debugging method and a recording medium to which a debugging program has been recorded and, more particularly, to a software debugging method and a recording medium to which a debugging program has been recorded whereby debugging is carried out by providing an actual memory area, an extended memory area, and an address space information area for the implementation of software.

2. Description of the Prior Arts

In general, the software for microcomputers is developed using language processors such as assembler and compiler. The language processors usually have two functions: one function is to convert a source program such as assembler or compiler into instruction codes, and the other function is to allocate the addresses of a memory on a target system, on which the program actually runs, by a linker. The former is referred to as language processor 1 and the latter as language processor 2.

When developing a source program, which provides the source of software, the source program is normally divided into a plurality of sub modules to ensure better outlook of the program or shorten the time required for language processor 1 to perform conversion. If a program were not divided as mentioned above, then even partial correction would require that the whole program be processed by language processor 1, thus leading to a prolonged total processing time.

The sub modules are converted to instruction codes by language processor 1 to produce a sub object program. Further, a plurality of sub object programs are combined and the absolute addresses of a target system are allocated to the respective instruction codes to provide an object program executable on the target system.

The software is debugged by loading and running the object program into and on the target system. If an error is found during debugging, then the original source program or the sub module is corrected, and only the corrected sub module is converted to an instruction code by language processor 1. Then, all sub object programs are combined by language processor 2 to generate an object program, and the entire object program is loaded into the target machine again to resume the debugging.

In the case of a large-scale system having sufficient memory for the capacity of the software, a method is available wherein the sub object program generated by language processor 1 again after a partial correction has been made is placed at an address not used by the object program before correction. In this case, language processor 2 allocates a new address to the corrected sub object program. Further, only the object programs such as branch instructions referring to other modules, which have been affected due to a module address change, for updated addresses are modified. Hence, the reprocessing time and reloading time by language processor 2 can be made shorter than the time required for combining and loading all sub object programs.

In debugging the software of a built-in system, the biggest concern is the time required for loading an object program into the memory of a target system (or the debugging device at the time of debugging). The development of software involves the repetition of a cycle composed of the correction of a source program, the conversion of the corrected source program into an object program, loading, and debugging. Accordingly, the shorter the time required for the cycle, the better. The prior art, however, has been posing a problem of a long total time required for converting a source program to an object program and also a long time required for loading an object program into a debugging device for the reasons described below.

In the method according to the prior art wherein only the modified modules and the affected places are reprocessed by language processor 2 and loaded into the large-scale system, the available memory is decreased as the debugging is repeated. As a result, this method becomes no longer usable when the sub object program to be loaded has grown larger than the available memory; hence, the linking and loading of the all sub object programs must be carried out again. Further, even a minor correction always requires one sub object program be loaded.

In addition, this method cannot be applied to a built-in system for which sufficient memory cannot be prepared to reduce the cost because the price always influences the sales. This leads particularly to an extremely longer time for loading an object program. In recent years, the improved performance of the central processing units (CPU) of personal computers or workstations has led to higher speed of the language processing systems for converting source programs to object programs; however, the speed of communication means for loading object programs into target systems (debugging devices) has not been increased much.

SUMMARY OF THE INVENTION

Accordingly, it is an object of the present invention to provide a software debugging method and a recording medium, to which a debugging program has been recorded, that permit a shorter total time required for converting a source program to an object program.

Another object of the present invention is to provide a software debugging method and a recording medium, to which a debugging program has been recorded, that permit a shorter time required for loading an object program even into a built-in system which cannot prepare a sufficient memory.

To these ends, according to one aspect of the present invention, there is provided a software debugging method for debugging software by employing a debugging device equipped with a memory in which there are an actual memory area inherent to a target system, an extended memory area equivalent to the actual memory area, and an address space information area for storing the address space information indicating whether the following execution address of each instruction code is in the actual memory area or the extended memory area; wherein: a source program constituting the software is converted to a machine language by a first language processing means to output a first object program on a basis of a plurality of sub modules, then an address in the actual memory area or the extended memory area of the memory in the debugging device is allocated to the first object program on the basis of a plurality of sub modules by a second language processing means; module location information indicating in which address range of the memory in the debugging device the sub modules will be placed is stored in storing means when outputting the first object program to the debugging device as a second object program having the address space information; it is determined whether the location information exists when correcting the sub module and if it exits and if the corrected sub module is smaller than the sub module before the correction, then the corrected sub module is placed in the address range of the location information of the sub module before the correction which corresponds to the sub module, or if the corrected sub module is larger than the sub module before the correction, then the excess portion is placed in a continuous area of the extended memory area; and an object program in which the address space information has been located in the address space information area is output.

According to the present invention, a sub module which has been corrected is placed in the address range of the location information of the sub module before the correction which corresponds to the sub module, and in this case, if the corrected sub module is larger than the sub module before it is corrected, then the excess portion thereof is located in a continuous area of the extended memory area and the address space information is placed in the address space information area to output the second object. Hence, the second object program to be supplied to the debugging device will include only the corrected sub module and the address space information.

Moreover, according to the method of the present invention, the sub module which has been corrected is placed in the address range of the location information of the sub module before the correction which corresponds to the sub module, and the difference between the corrected sub module and the sub module before the correction which corresponds to the sub module is output in the form of the second object program. This allows the second object program to be made smaller.

To fulfill the objects described above, according to another aspect of the present invention, there is provided a recording medium to which a debugging program for implementing the aforesaid debugging method has been recorded.

BRIEF DESCRIPTION OF THE DRAWINGS

FIG. 1 is a block diagram of an embodiment of the software debugging method and the debug program in accordance with the present invention;

FIG. 2 is a diagram illustrating an example of the memory area in a debugging device shown in FIG. 1;

FIG. 3 is a diagram illustrating an example of the stored information of a stored information file shown in FIG. 1;

DETAILED DESCRIPTION OF THE PREFERRED EMBODIMENTS

Figure 4:
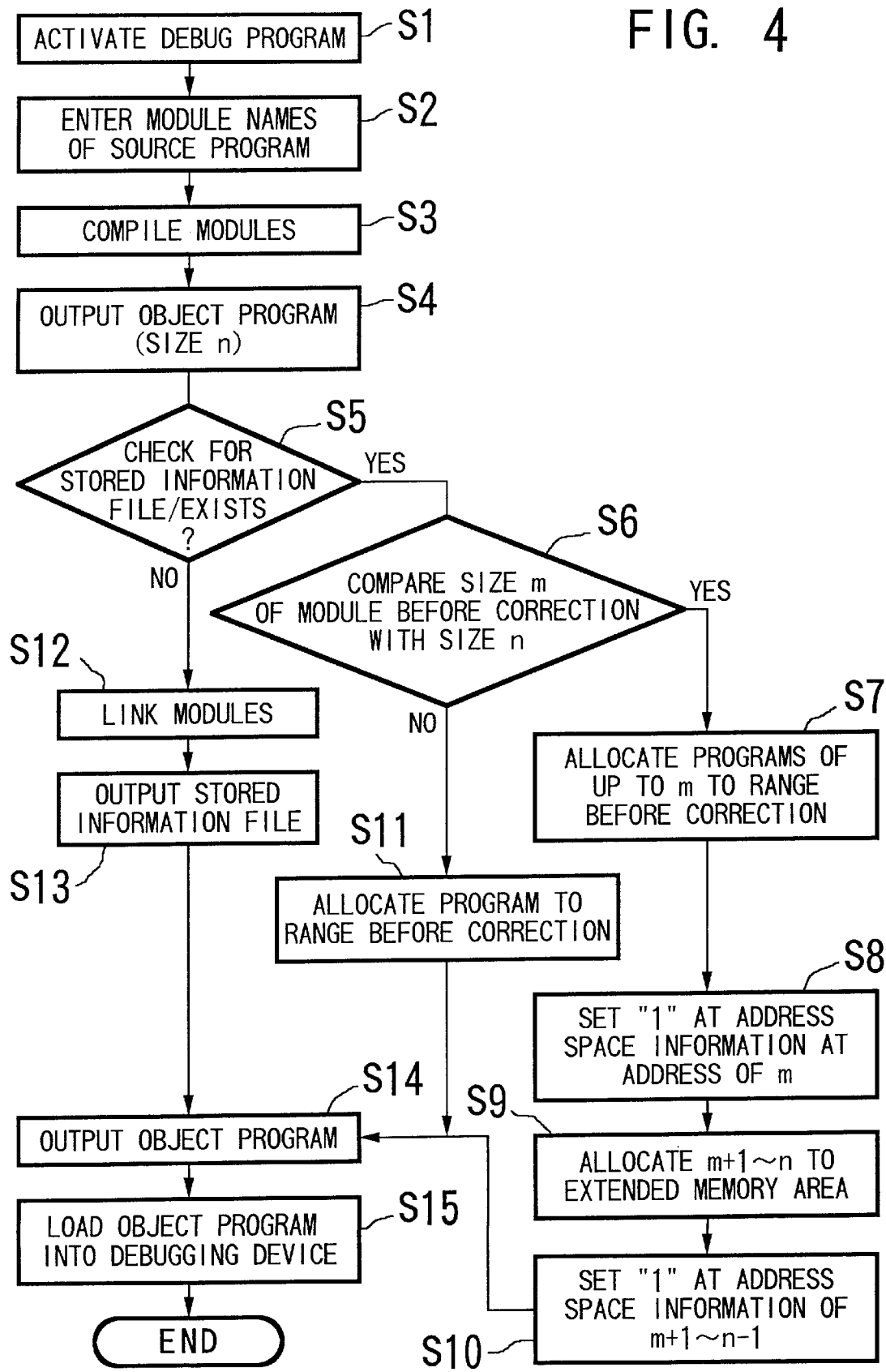
FIG. 4 is a flowchart illustrating the operation of a first embodiment of the debugging method in accordance with the present invention.

The embodiments of the present invention will now be described in conjunction with the accompanying drawings. FIG. 1 is a block diagram showing an embodiment of the software debugging method and debugging program in accordance with the present invention. The debugging method illustrated in the drawing includes: a source program 101 divided into a plurality of sub modules; a compiler 102 which converts the supplied source program 101 into a machine language and allocates relative addresses for each sub module; an object program 103 on a basis of the foregoing sub modules (hereinafter referred to simply as "modules") to which the processing results of the compiler 102 are supplied; a linker 104 which performs the processing for allocating an absolute address for storing the object program 103 in an actual memory 107 of a debugging device 106; an object program 105 to which an address of the memory 107 has been allocated and to which a processing result of the linker 104 has been output; the debugging device 106; and a stored information file 108 indicating the store addresses of the memory 107 in the debugging device 106, the addresses being given by the linker 104 to the respective modules of the object program 103.

This embodiment is applied to the computer system disclosed by the present applicant in Japanese Examined Patent Publication No. 6-79290. The computer system is equipped with: an instruction memory wherein instruction codes are stored; a central processing unit which reads the instruction codes from the instruction memory to execute the instructions indicated by the instruction codes; a space code memory wherein the address space code of the instruction memory storing the instruction code to be executed after each instruction code stored in the instruction memory is executed is stored at the same address as the instruction memory address where each instruction code is stored; and delaying means which delays the address space code read out from the space code memory by one instruction execution time of the central processing unit; wherein the addresses in the instruction memory and the space code memory are specified according to the output from the delaying means and the addresses received from the central processing unit.

In this computer system, there are an execution memory area (referred to as "actual memory area") inherent to a target system, an extended memory area equivalent to the actual memory area, and an address space information area for storing the information indicating whether the following execution address of each instruction code is in the actual memory area or the extended memory area.

FIG. 2 shows an example of the memory area of the memory 107 included in the debugging device 106 having the functions described in Japanese Examined Patent Publication 6-79290. The memory 107 has an actual memory area 201 equivalent to an actual target system in which the object program 105 is stored, an extended memory area 202 described in the foregoing publication, and an address space information area 203. The actual memory area 201 provides the address of the target system in which four modules 1031 through 1034 of the object program 103 are finally stored. The extended memory area 202 has the same capacity as the actual memory area 201.

FIG. 3 shows an example of the stored information of the stored information file 108. The stored information file 108 shown in the drawing is constituted by: a column 301 indicating the names of the foregoing modules 1031 through 1034; columns 302 and 303 that respectively indicate starting addresses and ending addresses of the areas wherein the modules 1031 through 1034 are stored; and a column 304 indicating the program sizes of the modules 1031 through 1034.

The operation of the embodiment shown in FIG. 1 through FIG. 3 will now be described with reference to the flowchart of FIG. 4. The debugging program recorded to the recording medium in accordance with the present invention is activated in the debugging device 106 (step S1), and the debugging procedure described below is initiated in accordance with the debugging program. More specifically, when the names of the four sub modules making up the source program 101 are entered (step S2), compiling is implemented on each sub module by the compiler 102 (step S3), and the object program 103 composed of the four modules 1031 through 1034 to which program sizes "n" have been added are output (step S4).

Next, the processing by the linker 104 is implemented and the presence of the stored information file 108 is checked (step S5). If the stored information file 108 does not exist, then the linking for all the modules 1031 through 1034 is carried out (step S12) and the stored information file 108 is output (step S13). If it has been determined in step S5 that the stored information file 108 exists, then the stored information is supplied to compare a module size "m" before making correction with the module size "n" after making correction (step 6).

If the module size "m" before correction is not less than the module size "n" after correction, then the corrected modules are directly stored in sequence in the actual memory area 201 where the modules before adding correction have been stored, beginning with the original starting address shown in the column 302 of FIG. 3 (step S11). If the module size "m" before correction is smaller than the module size "n" after correction, then those of up to the m-th module among the corrected modules are stored in the actual memory area 201 where the modules before correction have been stored, beginning with the original starting address shown in the column 302 of FIG. 3 (step S7), and "1" is set in the address space information area corresponding to the instruction code at address "m"(step S8). Subsequently, continuous addresses in the extended memory area 202 are allocated to the programs from an address of (m+1) and after (step S9). Further, "1" is set in the address space information area 203 corresponding to the (m+1)th to (n−1)th instruction codes (step S10).

Upon completion of the processing of step S10, S11, or S13, the object program 105 is output (step S14) and the output object program 105 is loaded into the debugging device 106 (step S15).

Figure 5:
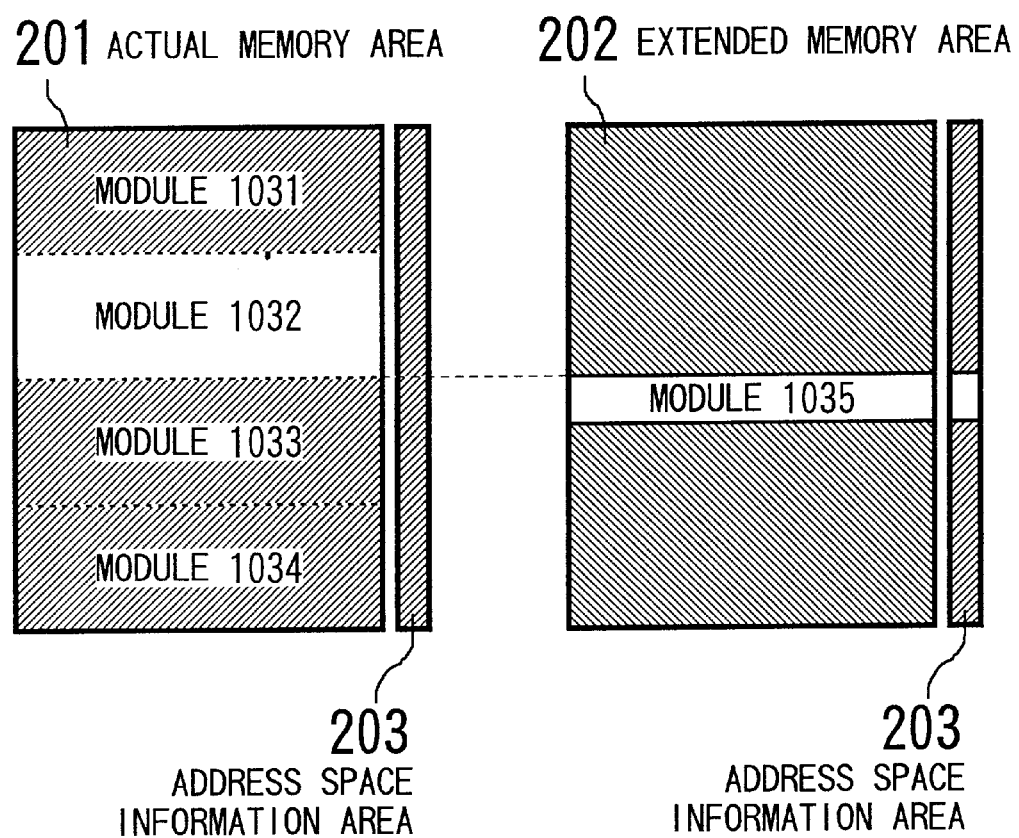
FIG. 5 is a diagram illustrating an example of an object program to be output to the debugging device by the method in accordance with the present invention.

FIG. 5 is a block diagram illustrating the object program in a case where the correction of the module 1032 during debugging results in a size exceeding the original address range. It is assumed, for example, that the size of the module 1032 after it is corrected is 90 steps. In this case, as shown in FIG. 3, the module up to the 80th step is placed in the original address arrange, namely, addresses of 151 to 230 (step S7); for the remaining 10 steps, the module is placed as a module 1035 at addresses of 231 to 240 of the extended memory area 202 as illustrated in FIG. 5 (step S9).

In order to indicate that the next execution address of each instruction code is in the extended memory area 202, "1" is set in the address space information area 203 corresponding to an address of 230 of the actual memory area 201 and the address space information area 203 corresponding to addresses of 231 through 239 of the extended memory area 202 (steps S8 and If the actual memory area 201 is being referred to in the branch instruction among the instruction codes of the extended memory area 202, then the next execution address is the actual memory area 201; hence, the corresponding address space information is reset. Likewise, if a symbol in the module 1035 is being referred to in the branch instruction present in the modules 1031 to 1034 of the actual memory area 201, then the processing for setting the corresponding address space information is carried out.

Thus, the object program output by the debugging method and the debugging program in accordance with the embodiment will include only the modules 1032 and 1035 and the portions referred to, i.e. the address space information. This enables the processing time including the loading time to be made shorter than that in the conventional debugging method wherein all components are combined and relocated before they are loaded into the debugging device.

A second embodiment of the present invention will be described in conjunction with the flowchart shown in FIG. 6. In the drawing, the like processing steps as those shown in FIG. 4 will be assigned the like reference numerals and the description thereof will be omitted. According to the second embodiment, the object program before correcting the module 1032 of the first embodiment and the object program after the correction are compared, and only the difference therebetween is output by a language processing system 2 and downloaded to the debugging device. This method permits further reduction in size compared with the first embodiment.

Figure 6:
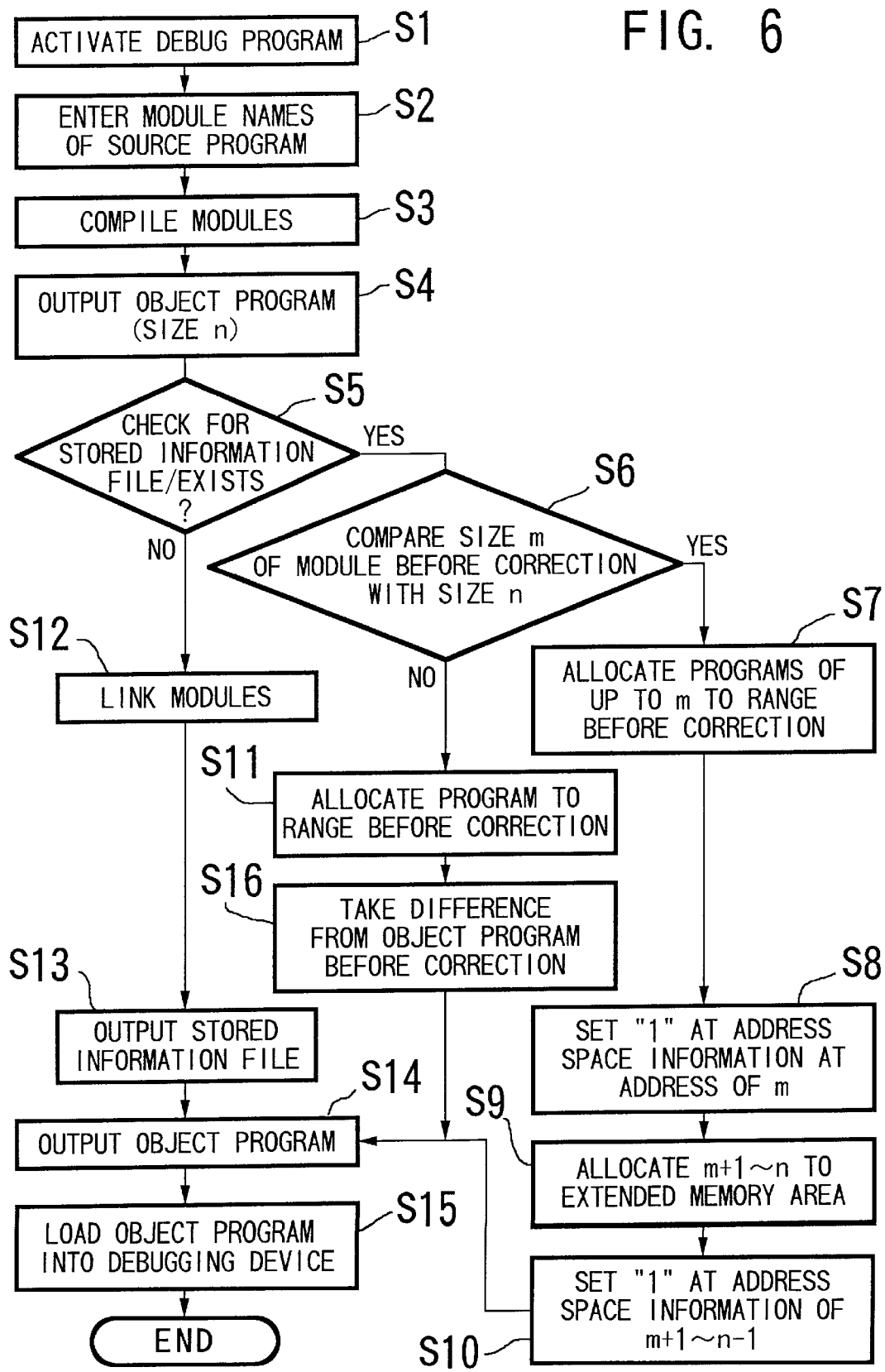
FIG. 6 is a flowchart illustrating the operation of a second embodiment of the debugging method in accordance with the present invention.

The flowchart shown in FIG. 6 is the same as that shown in FIG. 4 except that step S16 has been added. In step S16, it is determined whether a file having the same name exists; if a file of the same name has been found, then the object programs before and after correcting the modules 1032 are compared to output only the size difference (n-m). This permits a minimum size of the object program to be downloaded when less correction is involved. It is also possible to supply the difference in the same manner when "m" is smaller than "n" (m<n).

Thus, according to the present invention, the second object program output to the debugging device includes only the corrected sub modules and the address space information, so that the processing time including the loading time can be made shorter than the case where all sub modules are combined and relocated to load the object program into the debugging device. Hence, even for a built-in system wherein the debugging device has only a small memory area, the invention can be well applied with a resultant higher debugging efficiency.

Moreover, according to the present invention, the difference between a sub module after correction and the sub module before correction which corresponds to the sub module is output as the second object program thereby to make the second object program smaller. This makes it possible to minimize the size of the object program to be downloaded into the debugging device when less correction is involved, leading to even higher debugging efficiency.

What is claimed is:

1. A software debugging method for debugging software by employing a debugging device equipped with a memory wherein there are an actual memory area inherent to a target system, an extended memory area equivalent to said actual memory area, and an address space information area for storing the address space information indicating whether the next execution address of each instruction code is in said actual memory area or said extended memory area; wherein:

a source program constituting said software is converted to a machine language by a first language processing means to output a first object program on a basis of a plurality of sub modules, then an address in said actual memory area or said extended memory area of the memory in said debugging device is allocated to said first object program on the basis of a plurality of sub modules by a second language processing means; module location information indicating in which address range of the memory in said debugging device said sub modules will be placed is stored in storing means when outputting said first object program to said debugging device as a second object program having said address space information; it is determined whether said location information exists when correcting said sub module and if it exists and if the sub module after correction is smaller than the sub module before correction, then said sub module after correction is placed in the address range of the location information of said sub module before correction which corresponds to said sub module, or if said sub module after correction is larger than said sub module before correction, then the excess portion is placed in a continuous area in said extended memory area; and an object program wherein said address space information has been located in said address space information area is output.

2. A software debugging method according to claim 1, wherein said sub module after correction is placed in the address range of the location information of the sub module before correction which corresponds to said sub module, and the difference between said sub module after correction and said sub module before correction which corresponds to said sub module is output as said second object program.

3. A software debugging method according to claim 1, wherein said module location information indicating in which address range of the memory in said debugging device a module is placed includes a starting address and an ending address and the size of a program.

4. A recording medium to which a debugging program has been recorded for implementing the debugging of software by employing a debugging device equipped with a memory in which there are an actual memory area inherent to a target system, an extended memory area equivalent to said actual memory area, and an address space information area for storing the address space information that indicates whether the next execution address of each instruction code is in said actual memory area or said extended memory area; said debugging program being adapted such that:

a source program constituting said software is converted to a machine language by a first language processing means to output a first object program on a basis of a plurality of sub modules, then an address in said actual memory area or said extended memory area of the memory in said debugging device is allocated to said first object program on the basis of a plurality of sub modules by a second language processing means; module location information indicating in which address range of the memory in said debugging device said sub modules will be placed is stored in storing means when outputting said first object program to said debugging device as a second object program having said address space information; it is determined whether said location information exists when correcting said sub module and if it exists and if a sub module after correction is smaller than a sub module before correction, then said sub module after correction is placed in the address range of the location information of said sub module before the correction which corresponds to said sub module, or if said corrected sub module is larger than said sub module before correction, then the excess portion is placed in a continuous area in said extended memory area; and an object program wherein said address space information has been located in said address space information area is output.

5. A recording medium to which a debugging program has been recorded according to claim 4, wherein said debugging program is such that said sub module after correction is placed in the address range of the location information of said sub module before correction which corresponds to said sub module, and the difference between said sub module after correction and said sub module before correction which corresponds to said sub module is output as said second object program.

6. A recording medium to which a debugging program has been recorded according to claim 4, wherein said module location information indicating in which address range of the memory in said debugging device a module is placed includes a starting address and an ending address and the size of a program.

* * * * *